United States Patent
Byun et al.

(10) Patent No.: US 11,178,574 B2
(45) Date of Patent: Nov. 16, 2021

(54) SUPPORT OF LOAD BALANCING FOR SUPPLEMENTARY UPLINK IN CU-DU ARCHITECTURE

(71) Applicant: LG ELECTRONICS INC., Seoul (KR)

(72) Inventors: Daewook Byun, Seoul (KR); Hongsuk Kim, Seoul (KR); Jian Xu, Seoul (KR); Seokjung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/783,922

(22) Filed: Feb. 6, 2020

(65) Prior Publication Data
US 2020/0260324 A1    Aug. 13, 2020

(51) Int. Cl.
| | | |
|---|---|---|
| *H04W 28/08* | (2009.01) | |
| *H04W 76/27* | (2018.01) | |
| *H04W 80/02* | (2009.01) | |
| *H04W 4/40* | (2018.01) | |
| *H04W 36/22* | (2009.01) | |
| *G06N 20/00* | (2019.01) | |
| *H04W 80/08* | (2009.01) | |

(52) U.S. Cl.
CPC ............ *H04W 28/08* (2013.01); *G06N 20/00* (2019.01); *H04W 4/40* (2018.02); *H04W 36/22* (2013.01); *H04W 76/27* (2018.02); *H04W 80/02* (2013.01); *H04W 80/08* (2013.01)

(58) Field of Classification Search
None
See application file for complete search history.

(56) References Cited

U.S. PATENT DOCUMENTS

| | | | |
|---|---|---|---|
| 2019/0261234 A1* | 8/2019 | Park | H04W 36/0069 |
| 2020/0045583 A1* | 2/2020 | Kim | H04W 76/15 |
| 2020/0053799 A1* | 2/2020 | Jeon | H04W 16/14 |
| 2020/0154333 A1* | 5/2020 | Paladugu | H04B 7/022 |
| 2020/0162211 A1* | 5/2020 | Wang | H04L 5/0037 |

OTHER PUBLICATIONS

Section 6 of 3GPP TS 38.401 V15.4.0, Dec. 2018.
Sections 5.2 and 7.1 of 3GPP TS 38.470 V15.4.0, Dec. 2018.

* cited by examiner

*Primary Examiner* — Anh Vu H Ly
(74) *Attorney, Agent, or Firm* — Dentons US LLP

(57) ABSTRACT

A method and apparatus for support of load balancing for supplementary uplink (SUL) in central unit (CU)-distributed unit (DU) architecture in a new radio access technology (NR) is provided. A gNB central unit (gNB-CU) receives, from at least one gNB distributed unit (gNB-DU), information related to a load status of supplementary uplink (SUL) for the at least one gNB-DU, and determines to adjust at least one parameter related to the SUL for a gNB-DU, among the at least one gNB-DU, based on the information related to the load status of the SUL for the gNB-DU. Upon receiving information related to the at least one parameter related to the SUL from the gNB-CU, the gNB-DU may adjust the at least one parameter related to the SUL based on the information related to the at least one parameter related to the SUL.

11 Claims, 16 Drawing Sheets

SUPPORT OF LOAD BALANCING FOR SUPPLEMENTARY UPLINK IN CU-DU ARCHITECTURE

CROSS-REFERENCE TO RELATED APPLICATIONS

Pursuant to 35 U.S.C. § 119 (e), this application claims the benefit of Korean Patent Application No. 10-2019-0014778, filed on Feb. 8, 2019, the contents of which are all hereby incorporated by reference herein in their entirety.

TECHNICAL FIELD

The present disclosure relates to support of load balancing for supplementary uplink (SUL) in central unit (CU)-distributed unit (DU) architecture in a new radio access technology (NR).

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Usually, cell coverage in uplink (UL) direction is lower than downlink (DL) direction because user equipment (UE) transmission (Tx) Power (i.e., UL power) is not as strong as gNB Tx power (i.e., DL Power). The performance degradation on UL direction due to this difference gets very serious as the UE approaches to cell edge. Accordingly, an idea to use very low frequency than the original UL frequency may be proposed. The secondary UL at much lower frequency may be called a supplementary uplink (UL) in 5G NR.

SUMMARY

When a gNB is split into a gNB-central unit (CU) and gNB-distributed unit (DU), there may be need to balance supplementary uplink (SUL) load of cell(s) of gNB-DU(s) when user equipments (UEs) try to access SUL or use SUL to transmit uplink data.

In an aspect, a method for a gNB central unit (gNB-CU) in a wireless communication system is provided. The method includes receiving, from at least one gNB distributed unit (gNB-DU), information related to a load status of supplementary uplink (SUL) for the at least one gNB-DU, determining to adjust at least one parameter related to the SUL for a gNB-DU, among the at least one gNB-DU, based on the information related to the load status of the SUL for the gNB-DU, and transmitting, to the gNB-DU, information related to the at least one parameter related to the SUL for the gNB-DU.

In another aspect, a method for a gNB distributed unit (gNB-DU) in a wireless communication system is provided. The method includes monitoring a load status of supplementary uplink (SUL), transmitting, to a gNB central unit (gNB-CU), information for the load status of the SUL, receiving, from the gNB-CU, information for at least one parameter related to the SUL which is to be determined by the gNB-CU to be adjusted, and adjusting the at least one parameter related to the SUL based on the information for the at least one parameter related to the SUL.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Figure 1:
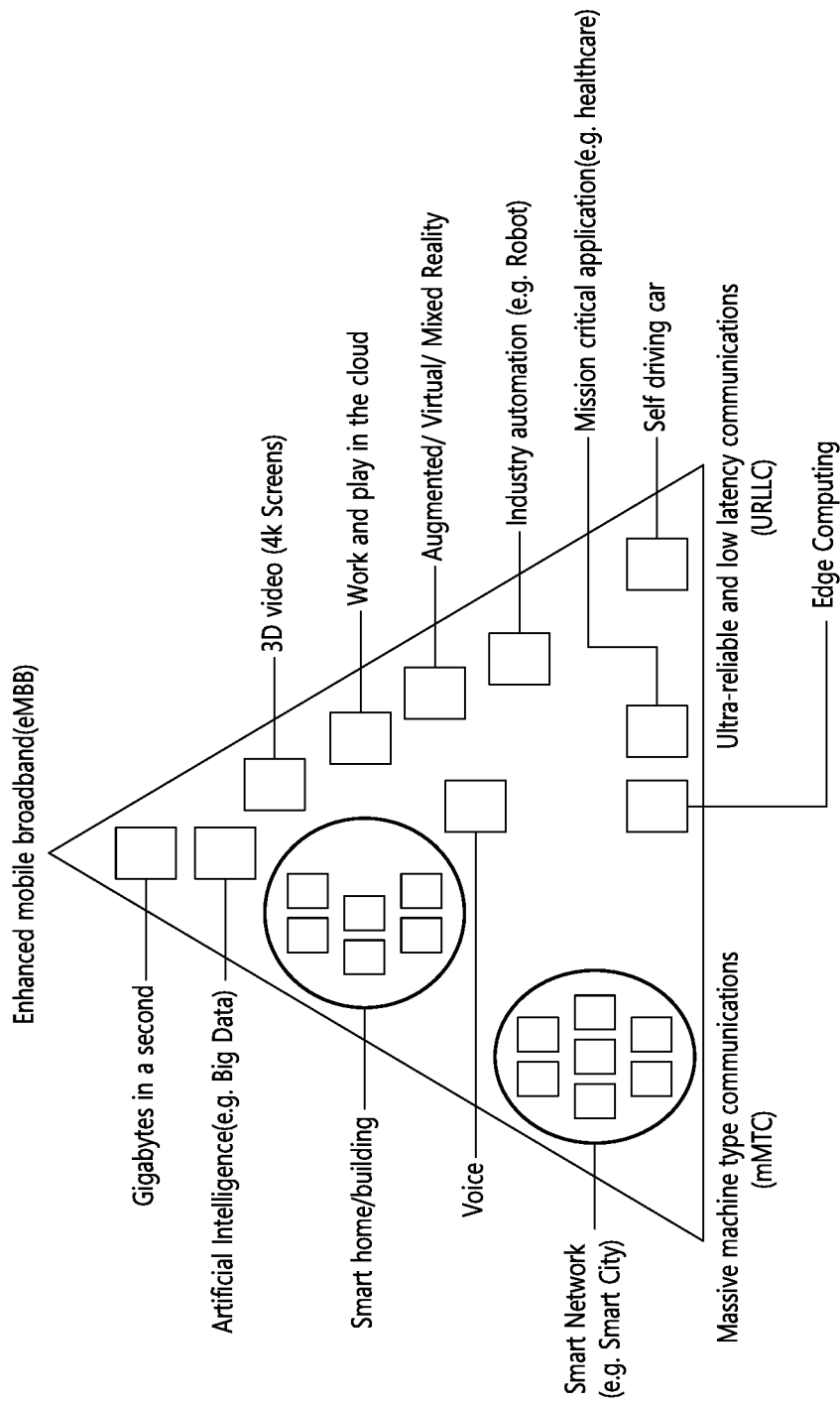
FIG. 1 shows examples of 5G usage scenarios to which the technical features of the present disclosure can be applied.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
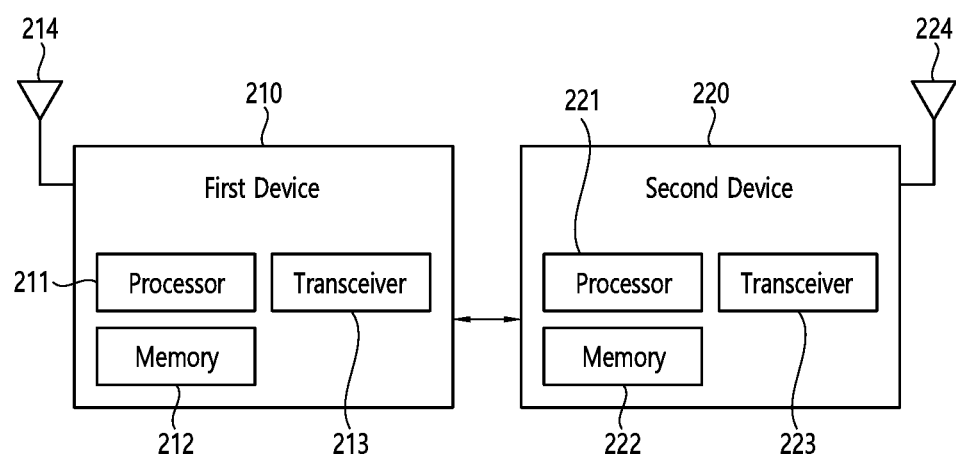
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g., a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 221, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
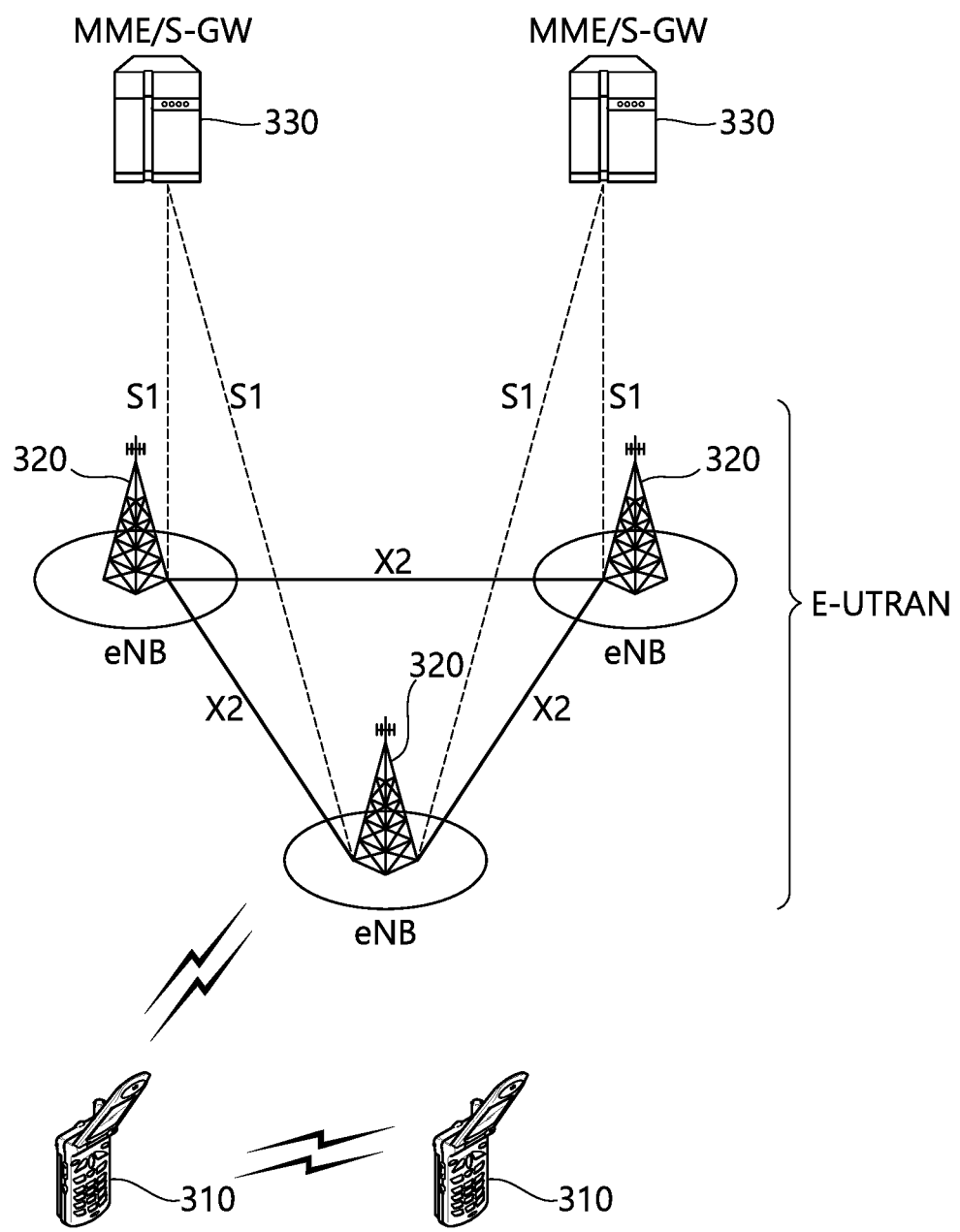
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
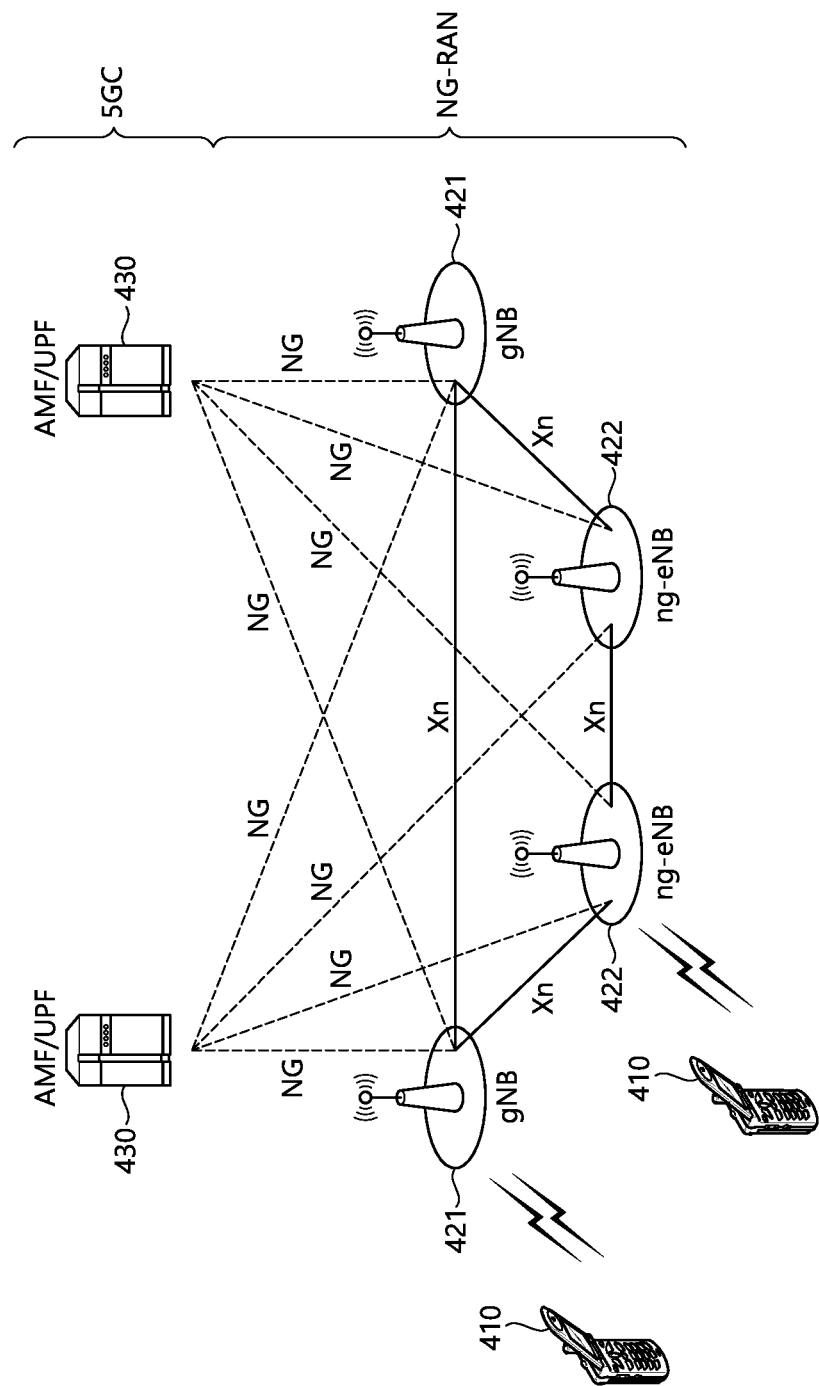
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g., eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g., NG-RAN and/or E-UTRAN) may be classified into a first layer (L1), a second layer (L2), and a third layer (L3) based on the lower three layers of the open system interconnection (OSI) model that is well-known in the communication system.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 5:
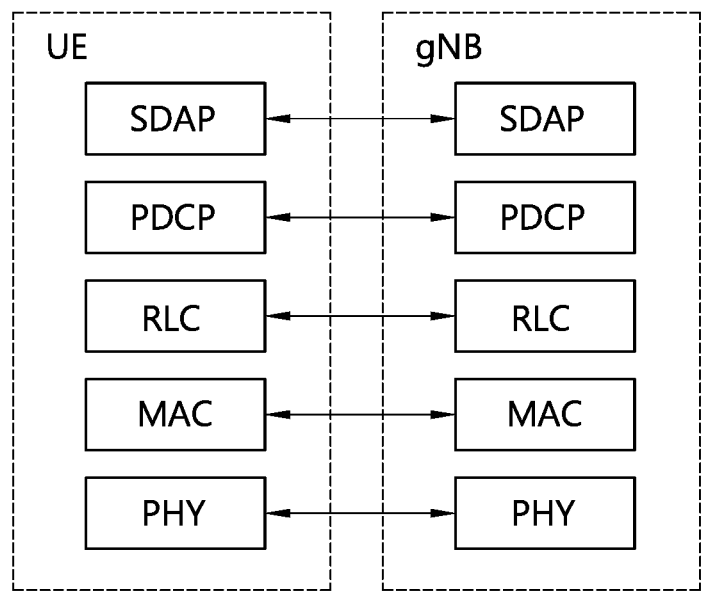
FIG. 5 shows a block diagram of a user plane protocol stack to which the technical features of the present disclosure can be applied.
Figure 6:
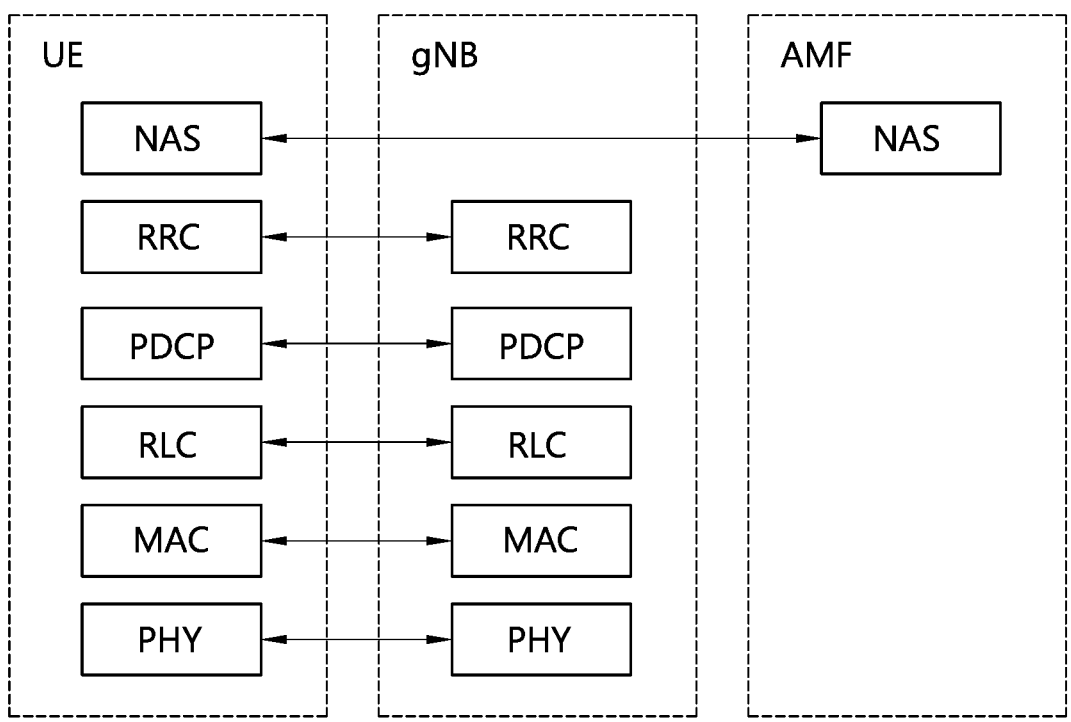
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

Split of gNB central unit (gNB-CU) and gNB distributed unit (gNB-DU) is described. Section 6 of 3GPP TS 38.401 V15.4.0 (2018-12) and Sections 5.2 and 7.1 of 3GPP TS 38.470 V15.4.0 (2018-12) may be referred.

Figure 7:
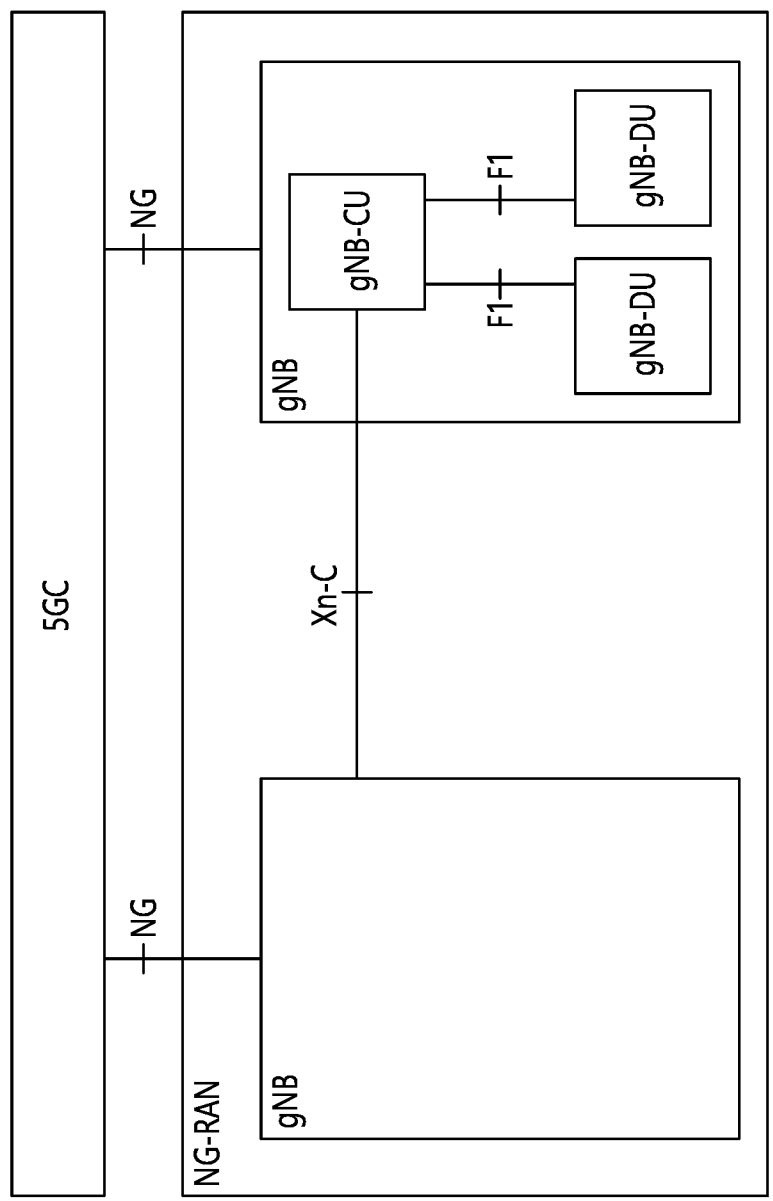
FIG. 7 shows an example of the overall architecture of an NG-RAN to which technical features of the present disclosure can be applied.

FIG. 7 shows an example of the overall architecture of an NG-RAN to which technical features of the present disclosure can be applied.

Referring to FIG. 7, a gNB may include a gNB-CU (hereinafter, gNB-CU may be simply referred to as CU) and one or more gNB-DU (hereinafter, gNB-DU may be simply referred to as DU).

The gNB-CU is a logical node hosting RRC, SDAP and PDCP protocols of the gNB or an RRC and PDCP protocols of the en-gNB. The gNB-CU controls the operation of one or more gNB-DU.

The gNB-DU is a logical node hosting RLC, MAC, and physical layers of the gNB or the en-gNB. The operation of the gNB-DU is partly controlled by the gNB-CU. One gNB-DU supports one or multiple cells. One cell is supported by only one gNB-DU.

The gNB-CU and gNB-DU are connected via an F1 interface. The gNB-CU terminates the F1 interface connected to the gNB-DU. The gNB-DU terminates the F1 interface connected to the gNB-CU. One gNB-DU is connected to only one gNB-CU. However, the gNB-DU may be connected to multiple gNB-CUs by appropriate implementation. The F1 interface is a logical interface.

For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

The node hosting user plane part of NR PDCP (e.g., gNB-CU, gNB-CU-UP, and for EN-DC, MeNB or SgNB depending on the bearer split) shall perform user inactivity monitoring and further informs its inactivity or (re)activation to the node having C-plane connection towards the core network (e.g., over E1, X2). The node hosting NR RLC (e.g., gNB-DU) may perform user inactivity monitoring and further inform its inactivity or (re)activation to the node hosting control plane, e.g., gNB-CU or gNB-CU-CP.

UL PDCP configuration (i.e., how the UE uses the UL at the assisting node) is indicated via X2-C (for EN-DC), Xn-C (for NG-RAN) and F1-C. Radio Link outage/resume for DL and/or UL is indicated via X2-U (for EN-DC), Xn-U (for NG-RAN) and F1-U.

The NG-RAN is layered into a radio network layer (RNL) and a transport network layer (TNL).

The NG-RAN architecture, i.e., the NG-RAN logical nodes and interfaces between them, is defined as part of the RNL.

For each NG-RAN interface (NG, Xn, F1), the related TNL protocol and the functionality are specified. The TNL provides services for user plane transport, signaling transport.

In NG-Flex configuration, each gNB is connected to all AMFs within an AMF Region.

If security protection for control plane and user plane data on TNL of NG-RAN interfaces has to be supported, network domain security (NDS)/IP shall be applied.

Functions of the F1 interface includes F1 control (F1-C) functions as follows.

(1) F1 Interface Management Function

The error indication function is used by the gNB-DU or gNB-CU to indicate to the gNB-CU or gNB-DU that an error has occurred.

The reset function is used to initialize the peer entity after node setup and after a failure event occurred. This procedure can be used by both the gNB-DU and the gNB-CU.

The F1 setup function allows to exchange application level data needed for the gNB-DU and gNB-CU to interoperate correctly on the F1 interface. The F1 setup is initiated by the gNB-DU.

The gNB-CU configuration update and gNB-DU configuration update functions allow to update application level configuration data needed between gNB-CU and gNB-DU to interoperate correctly over the F1 interface, and may activate or deactivate cells.

The F1 setup and gNB-DU configuration Update functions allow to inform the single network slice selection assistance information (S-NSSAI) supported by the gNB-DU.

The F1 resource coordination function is used to transfer information about frequency resource sharing between gNB-CU and gNB-DU.

The gNB-DU status indication function allows the gNB-DU to indicate overload status to gNB-CU.

(2) System Information Management Function

Scheduling of system broadcast information is carried out in the gNB-DU. The gNB-DU is responsible for transmitting the system information according to the scheduling parameters available.

The gNB-DU is responsible for the encoding of NR master information block (MIB). In case broadcast of system information block type-1 (SIB1) and other SI messages is needed, the gNB-DU is responsible for the encoding of SIB1 and the gNB-CU is responsible for the encoding of other SI messages.

To support Msg3 based on-demand SI, the gNB-CU can confirm the received SI request from the UE by including the UE identity, and command the gNB-DU to broadcast the requested other SIs.

(3) F1 UE Context Management Function

The F1 UE context management function supports the establishment and modification of the necessary overall UE context.

The establishment of the F1 UE context is initiated by the gNB-CU and accepted or rejected by the gNB-DU based on admission control criteria (e.g., resource not available).

The modification of the F1 UE context can be initiated by either gNB-CU or gNB-DU. The receiving node can accept or reject the modification. The F1 UE context management function also supports the release of the context previously established in the gNB-DU. The release of the context is triggered by the gNB-CU either directly or following a request received from the gNB-DU. The gNB-CU request the gNB-DU to release the UE Context when the UE enters RRC_IDLE or RRC_INACTIVE.

This function can be also used to manage DRBs and SRBs, i.e., establishing, modifying and releasing DRB and SRB resources. The establishment and modification of DRB resources are triggered by the gNB-CU and accepted/rejected by the gNB-DU based on resource reservation information and QoS information to be provided to the gNB-DU. For each DRB to be setup or modified, the S-NSSAI may be provided by gNB-CU to the gNB-DU in the UE context setup procedure and the UE context modification procedure.

The mapping between QoS flows and radio bearers is performed by gNB-CU and the granularity of bearer related management over F1 is radio bearer level. For NG-RAN, the gNB-CU decides an aggregated DRB QoS profile for each radio bearer based on received QoS flow profile, and provides both aggregated DRB QoS profile and QoS flow profile to the gNB-DU, and the gNB-DU either accepts the request or rejects it with appropriate cause value. To support packet duplication for intra-gNB-DU carrier aggregation (CA), one data radio bearer should be configured with two GPRS tunneling protocol (GTP)-U tunnels between gNB-CU and a gNB-DU.

With this function, gNB-CU requests the gNB-DU to setup or change of the special cell (SpCell) for the UE, and the gNB-DU either accepts or rejects the request with appropriate cause value.

With this function, the gNB-CU requests the setup of the secondary cell(s) (SCell(s)) at the gNB-DU side, and the gNB-DU accepts all, some or none of the SCell(s) and replies to the gNB-CU. The gNB-CU requests the removal of the SCell(s) for the UE.

With this function, the gNB-CU indicates the UL UE AMBR limit to the gNB-DU, and the gNB-DU enforces the indicated limit.

(4) RRC Message Transfer Function

This function allows to transfer RRC messages between gNB-CU and gNB-DU. RRC messages are transferred over F1-C. The gNB-CU is responsible for the encoding of the dedicated RRC message with assistance information provided by gNB-DU. This function also allows gNB-DU to report to gNB-CU if the downlink RRC message has been successfully delivered to UE or not.

(5) Paging Function

The gNB-DU is responsible for transmitting the paging information according to the scheduling parameters provided.

The gNB-CU provides paging information to enable the gNB-DU to calculate the exact paging occasion (PO) and paging frame (PF). The gNB-CU determines the paging attempt (PA). The gNB-DU consolidates all the paging records for a particular PO, PF and PA, and encodes the final RRC message and broadcasts the paging message on the respective PO, PF in the PA.

(6) Warning Messages Information Transfer Function

This function allows to cooperate with the warning message transmission procedures over NG interface. The gNB-CU is responsible for encoding the warning related SI message and sending it together with other warning related information for the gNB-DU to broadcast over the radio interface.

Figure 8:
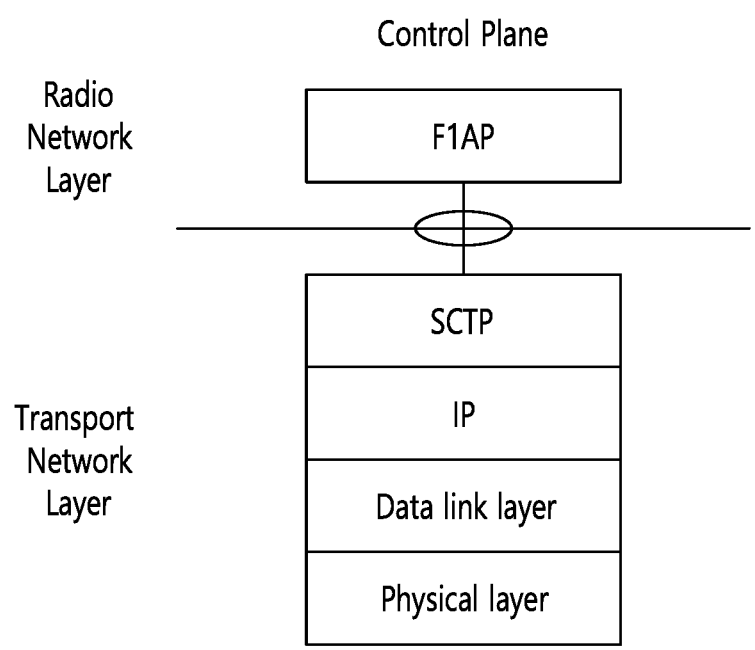
FIG. 8 shows an interface protocol structure for F1-C to which technical features of the present disclosure can be applied.

FIG. 8 shows an interface protocol structure for F1-C to which technical features of the present disclosure can be applied.

TNL is based on Internet protocol (IP) transport, comprising a stream control transmission protocol (SCTP) layer on top of the IP layer. An application layer signaling protocol is referred to as an F1 application protocol (E1AP).

Figure 9:
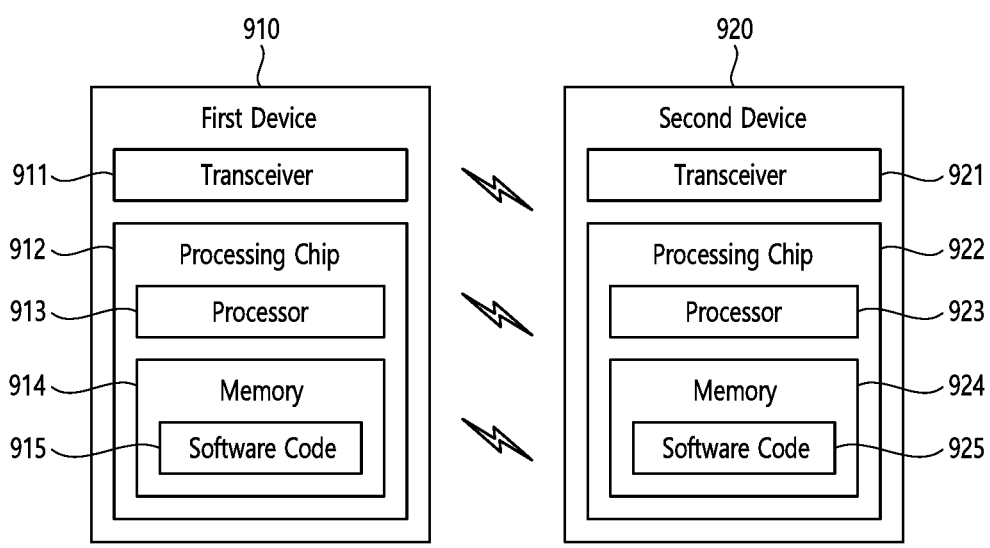
FIG. 9 shows another example of a wireless communication system to which the technical features of the present disclosure can be applied.

FIG. 9 shows another example of a wireless communication system to which the technical features of the present disclosure can be applied.

Referring to FIG. 9, wireless devices 910 and 920 may correspond to the wireless devices 210 and 220 of FIG. 2 and may be configured by various elements, components, units/portions, and/or modules.

The first wireless device 910 may include at least one transceiver, such as a transceiver 911, and at least one processing chip, such as a processing chip 912. The processing chip 912 may include at least one processor, such a processor 913, and at least one memory, such as a memory 914. The memory 914 may be operably connectable to the processor 913. The memory 914 may store various types of information and/or instructions. The memory 914 may store a software code 915 which implements instructions that, when executed by the processor 913, perform the descriptions, functions, procedures, suggestions, methods and/or operational flowcharts disclosed in the present disclosure. For example, the software code 915 may implement instructions that, when executed by the processor 913, perform the descriptions, functions, procedures, suggestions, methods and/or operational flowcharts disclosed in the present disclosure. For example, the software code 915 may control the processor 913 to perform one or more protocols. For example, the software code 915 may control the processor 913 may perform one or more layers of the radio interface protocol.

The second wireless device 920 may include at least one transceiver, such as a transceiver 921, and at least one processing chip, such as a processing chip 922. The processing chip 922 may include at least one processor, such a processor 923, and at least one memory, such as a memory 924. The memory 924 may be operably connectable to the processor 923. The memory 924 may store various types of information and/or instructions. The memory 924 may store a software code 925 which implements instructions that, when executed by the processor 923, perform the descriptions, functions, procedures, suggestions, methods and/or operational flowcharts disclosed in the present disclosure. For example, the software code 925 may implement instructions that, when executed by the processor 923, perform the descriptions, functions, procedures, suggestions, methods and/or operational flowcharts disclosed in the present disclosure. For example, the software code 925 may control the processor 923 to perform one or more protocols. For example, the software code 925 may control the processor 923 may perform one or more layers of the radio interface protocol.

Figure 10:
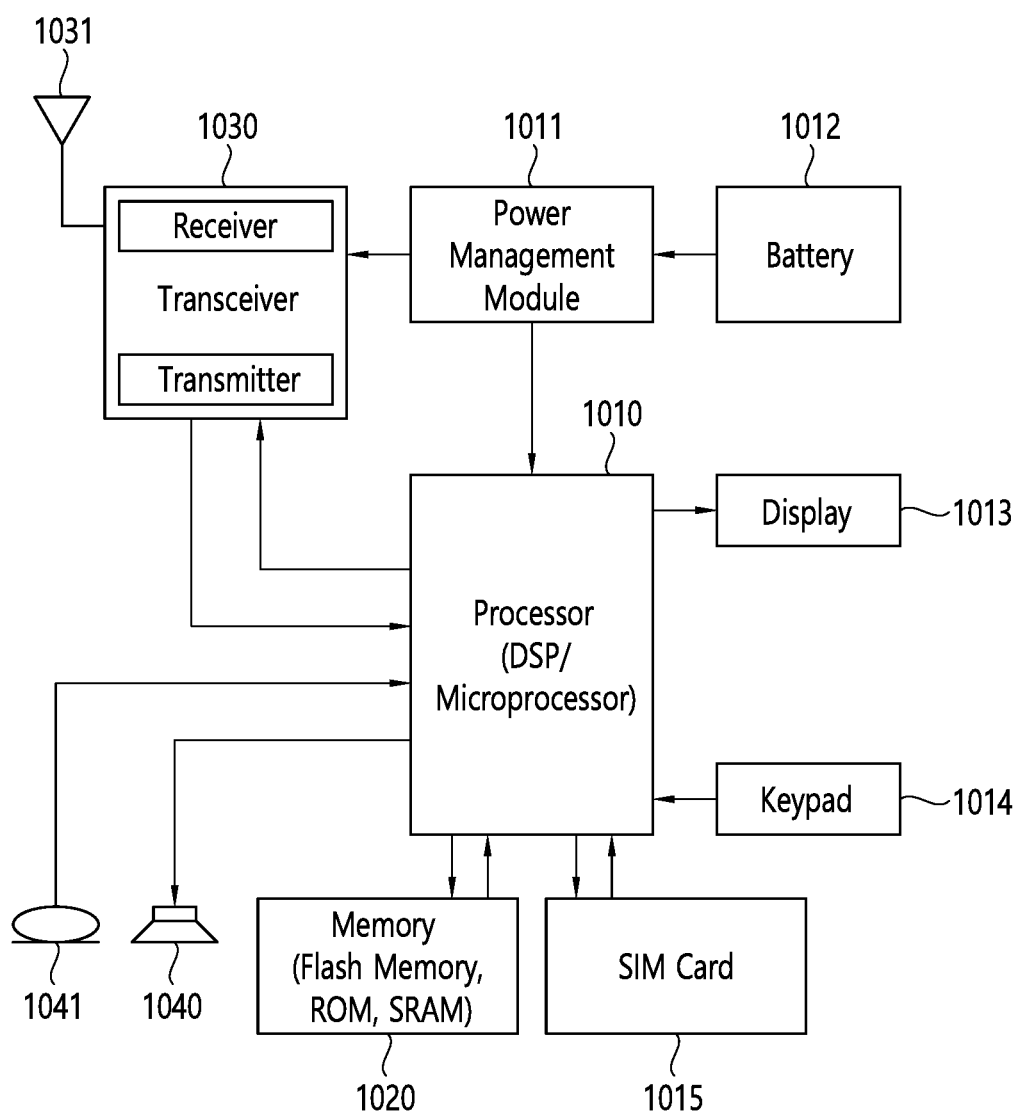
FIG. 10 shows an example of UE to which the technical features of the present disclosure can be applied.

FIG. 10 shows an example of UE to which the technical features of the present disclosure can be applied.

A UE includes a processor 1010, a power management module 1011, a battery 1012, a display 1013, a keypad 1014, a subscriber identification module (SIM) card 1015, a memory 1020, a transceiver 1030, one or more antennas 1031, a speaker 1040, and a microphone 1041.

The processor 1010 may be configured to implement the descriptions, functions, procedures, suggestions, methods and/or operational flowcharts disclosed in the present disclosure. The processor 1010 may be configured to control one or more other components of the UE to implement the descriptions, functions, procedures, suggestions, methods and/or operational flowcharts disclosed in the present disclosure. Layers of the radio interface protocol may be implemented in the processor 1010. The processor 1010 may include ASIC, other chipset, logic circuit and/or data processing device. The processor 1010 may be an application processor. The processor 1010 may include at least one of a digital signal processor (DSP), a central processing unit (CPU), a graphics processing unit (GPU), a modem (modulator and demodulator). An example of the processor 1010 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 1011 manages power for the processor 1010 and/or the transceiver 1030. The battery 1012 supplies power to the power management module 1011. The display 1013 outputs results processed by the processor 1010. The keypad 1014 receives inputs to be used by the processor 1010. The keypad 1014 may be shown on the display 1013. The SIM card 1015 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1020 is operatively coupled with the processor 1010 and stores a variety of information to operate the processor 1010. The memory 1020 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1020 and executed by the processor 1010. The memory 1020 can be implemented within the processor 1010 or external to the processor 1010 in which case those can be communicatively coupled to the processor 1010 via various means as is known in the art.

The transceiver 1030 is operatively coupled with the processor 1010, and transmits and/or receives a radio signal. The transceiver 1030 includes a transmitter and a receiver. The transceiver 1030 may include baseband circuitry to process radio frequency signals. The transceiver 1030 controls the one or more antennas 1031 to transmit and/or receive a radio signal.

The speaker 1040 outputs sound-related results processed by the processor 1010. The microphone 1041 receives sound-related inputs to be used by the processor 1010.

In carrier aggregation (CA), two or more component carriers (CCs) are aggregated. A UE may simultaneously receive or transmit on one or multiple CCs depending on its capabilities. CA is supported for both contiguous and non-contiguous CCs. When CA is deployed, frame timing and system frame number (SFN) are aligned across cells that can be aggregated. The maximum number of configured CCs for a UE is 16 for DL and 16 for UL.

In conjunction with a UL/DL carrier pair (frequency division duplex (FDD) band) or a bidirectional carrier (time division duplex (TDD) band), a UE may be configured with additional, supplementary uplink (SUL). SUL differs from the aggregated uplink in that the UE may be scheduled to transmit either on the supplementary uplink or on the uplink of the carrier being supplemented, but not on both at the same time.

Figure 11:
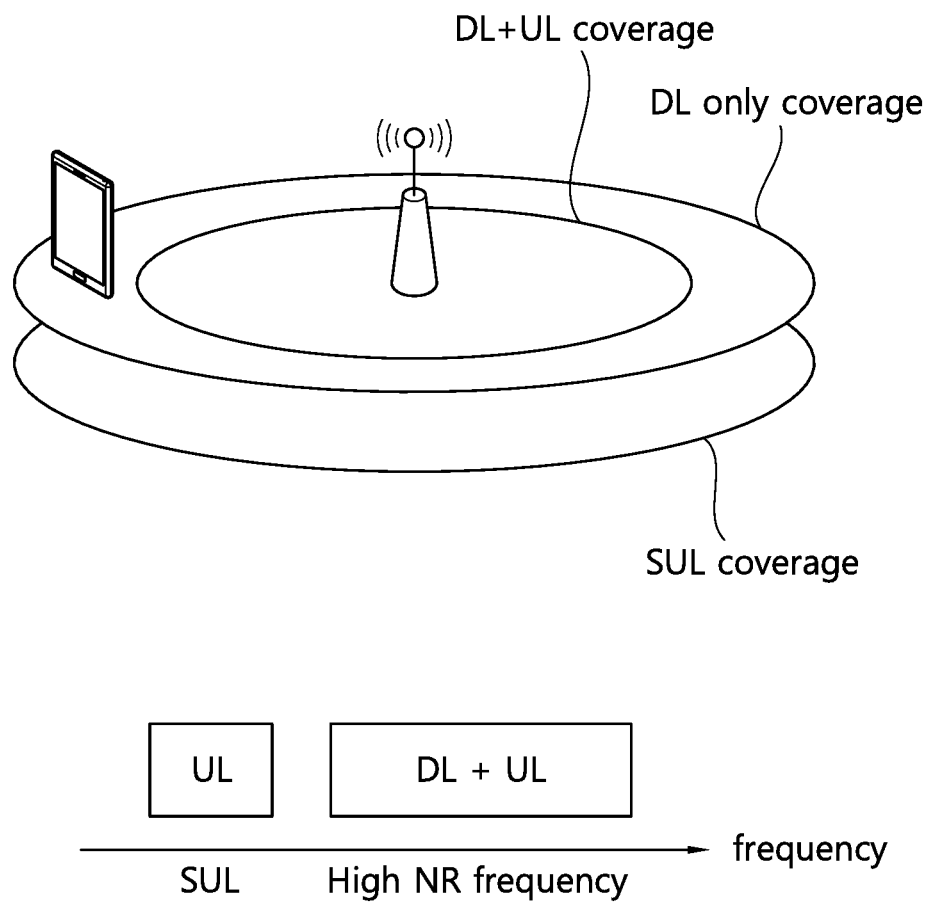
FIG. 11 shows an example of supplementary uplink to which the technical features of the present disclosure can be applied.

FIG. 11 shows an example of supplementary uplink to which the technical features of the present disclosure can be applied.

To improve UL coverage for high frequency scenarios, SUL can be configured. With SUL, the UE is configured with 2 ULs for one DL of the same cell, and uplink transmissions on those two ULs are controlled by the network to avoid overlapping physical shared channel (PUSCH)/physical uplink control channel (PUCCH) transmissions in time. Overlapping transmissions on PUSCH are avoided through scheduling while overlapping transmissions on PUCCH are avoided through configuration (PUCCH can only be configured for only one of the 2 ULs of the cell). In addition, initial access is supported in each of the uplink.

In LTE/LTE-A, mobility load balancing is supported. The objective of load balancing is to distribute cell load evenly among cells or to transfer part of the traffic from congested cells. This is done by the means of self-optimization of mobility parameters or handover actions.

Self-optimization of the intra-LTE and inter-RAT mobility parameters to the current load in the cell and in the adjacent cells can improve the system capacity compared to static/non-optimized cell reselection/handover parameters. Such optimization can also minimize human intervention in the network management and optimization tasks.

Support for mobility load balancing consists of one or more of following functions:
  Load reporting;
  Load balancing action based on handovers;
  Adapting handover and/or reselection configuration.

Like LTE/LTE-A, in order to reduce or avoid distribute cell load evenly among cells or to transfer part of the traffic from congested cells, self-optimization network (SON) features including load balancing related optimization should be addressed in 5G NR by taking NR new features into account. Among these NR features, there is SUL to improve UL coverage for high frequency scenarios. Among these NR features, there is CU-DU split architecture. Therefore, load balancing considering SUL in CU-DU split architecture, i.e., load balancing considering SUL within gNB, should be addressed.

Considering SUL in CU-DU split architecture, the gNB-DU will manage SUL, and accordingly, the gNB-DU will monitor of SUL load. Currently, the gNB-CU can only know whether the gNB-DU which the gNB-CU hosts is overloaded or not. That is, if SUL of cell(s) within the gNB-DU is congested, the gNB-CU can only know that the gNB-DU is overloaded. But the gNB-CU cannot identify why the overload happens at the gNB-DU. Therefore, the gNB-CU cannot handle this case appropriately. Therefore, a solution for reducing or avoiding a congestion case for SUL of cell(s) of the gNB-DU(s), and/or for distributing SUL load of cells within the same gNB-DU or of the gNB-DUs may be necessary.

According to implementations of the present disclosure, the gNB-DU may provide the gNB-CU with information related to SUL load status via F1 interface, in order to balance SUL load between cells within the same gNB-DU and/or between gNB-DUs within the same gNB-CU. For example, the information related to SUL load status may be transmitted when SUL load of a cell within the gNB-DU and/or SUL load of the gNB-DU exceeds a pre-defined threshold related to SUL load status. For example, the information related to SUL load status may be transmitted whenever a pre-defined time has reached. The provision of the information related to SUL load status by the gNB-DU may be performed according to the request by the gNB-CU which hosts the gNB-DU.

Then, according to implementations of the present disclosure, based on the information related to SUL load status received from the gNB-DUs, the gNB-CU requests change of SUL related parameter(s) which the gNB-DU has. This request may include change of the SUL related parameter(s) determined by the gNB-CU. For example, the gNB-CU may request change of q-RxLevMinSUL, which is a minimum required reception level in a cell.

Figure 12:
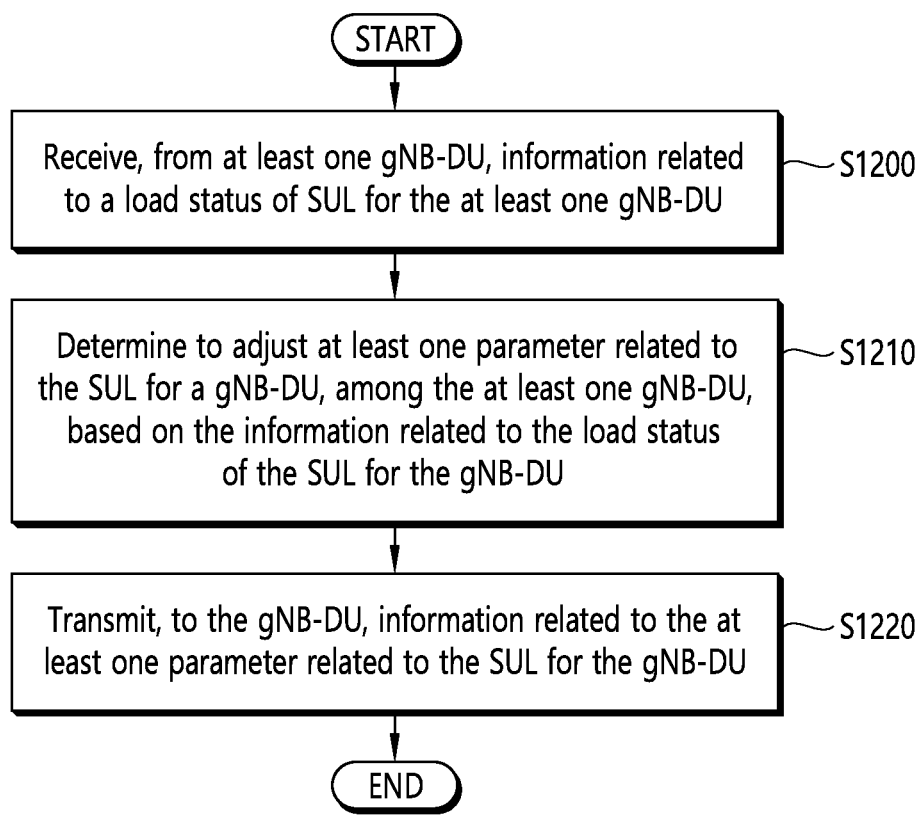
FIG. 12 shows an example of a method for a gNB-CU to which the technical features of the present disclosure can be applied.

FIG. 12 shows an example of a method for a gNB-CU to which the technical features of the present disclosure can be applied.

In some implementations, a wireless device may be configured with one DL and two ULs including SUL in a cell. The wireless device is in communication with at least one of a mobile device, a network, and/or autonomous vehicles other than the wireless device.

In some implementations, the gNB-CU may be a logical node constituting a gNB that hosts RRC layer and PDCP layer.

In step S1200, the gNB-CU receives, from at least one gNB-DU, information related to a load status of SUL for the at least one gNB-DU.

In some implementations, the information related to the load status of the SUL for the at least one gNB-DU may be received per cell of the at least one gNB-DU.

In some implementations, the information related to the load status of the SUL for the at least one gNB-DU may include a load percentage value of the SUL for the at least one gNB-DU. The information related to the load status of the SUL for the at least one gNB-DU may include a load level of the SUL for the at least one gNB-DU.

In some implementations, the information related to the load status of the SUL for the at least one gNB-DU may be received via a gNB-DU Status Indication message, a Resource Status Update message, and/or a new message.

In step S1210, the gNB-CU determines to adjust at least one parameter related to the SUL for a gNB-DU, among the at least one gNB-DU, based on the information related to the load status of the SUL for the gNB-DU.

In some implementations, the at least one parameter related to the SUL for the gNB may include q-RxLevMin-SUL, which is a minimum required reception level in a cell.

In some implementations, the gNB-CU may initiate a handover towards a neighbor cell of a second gNB-DU among the at least one gNB-DU.

In step S1220, the gNB-CU transmits, to the gNB-DU, information related to the at least one parameter related to the SUL for the gNB-DU.

In some implementations, the information related to the at least one parameter related to the SUL for the gNB-DU may be transmitted per cell of the gNB-DU.

In some implementations, the information related to the at least one parameter related to the SUL for the gNB-DU may include an exact value of the at least one parameter to be adjusted. The information related to the at least one parameter related to the SUL for the gNB-DU may include a difference between the at least one parameter to be adjusted from a pre-defined value.

In some implementations, the information related to the at least one parameter related to the SUL for the gNB-DU may be transmitted via a gNB-CU Configuration Update message and/or a new message.

Figure 13:
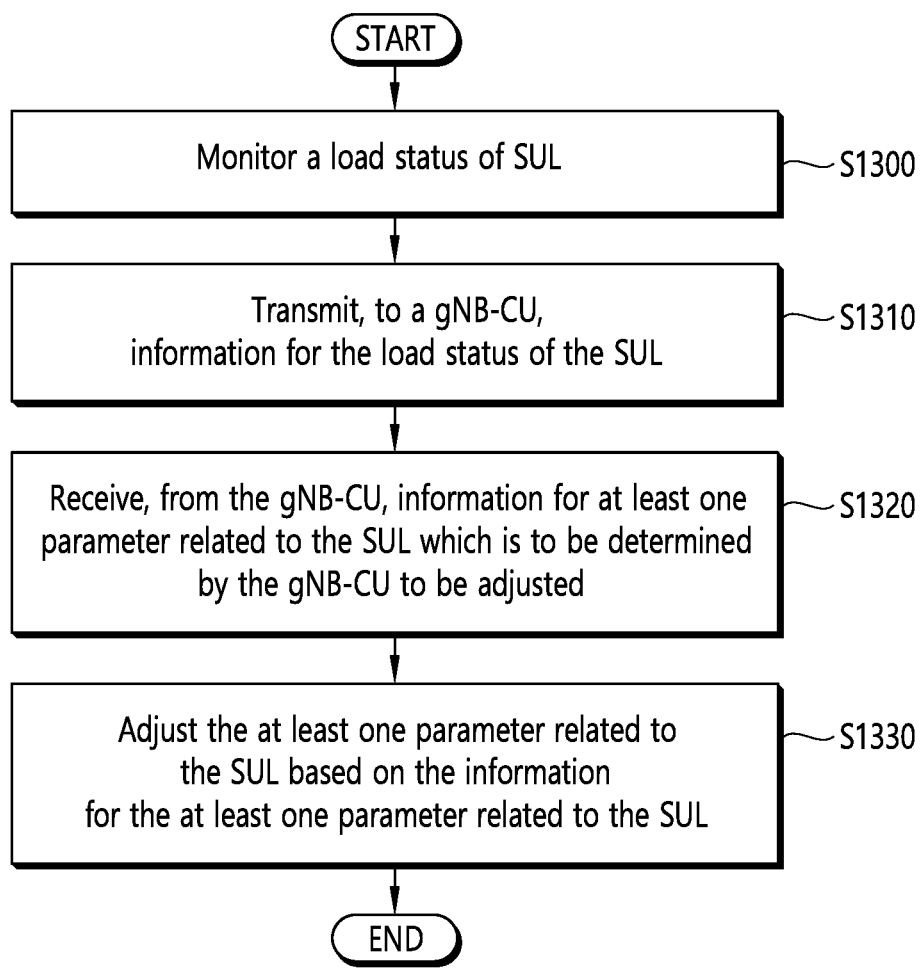
FIG. 13 shows an example of a method for a gNB-DU to which the technical features of the present disclosure can be applied.

FIG. 13 shows an example of a method for a gNB-DU to which the technical features of the present disclosure can be applied.

In some implementations, the gNB-DU may be a logical node constituting a gNB that hosts RLC layer, MAC layer and a physical layer.

In step S1300, the gNB-DU monitors a load status of SUL.

In some implementations, the load status of the SUL may be monitored based on at least one of an amount of traffic using the SUL and/or a number of wireless devices which try to access to the SUL or are connected to the SUL.

In step S1310, the gNB-DU transmits, to a gNB-CU, information for the load status of the SUL.

In some implementations, the information for the load status of the SUL may be transmitted upon that the load status of the SUL exceeds a threshold. The information for the load status of the SUL may be transmitted upon expiry of a timer.

In some implementations, the information for the load status of the SUL may be transmitted per cell.

In some implementations, the information for the load status of the SUL may include a load percentage value of the SUL. The information for the load status of the SUL may include a load level of the SUL.

In some implementations, the information for the load status of the SUL may be transmitted via a gNB-DU Status Indication message, a Resource Status Update message, and/or a new message.

In step S1320, the gNB-DU receives, from the gNB-CU, information for at least one parameter related to the SUL which is to be determined by the gNB-CU to be adjusted.

In some implementations, the information for the at least one parameter related to the SUL may be received per cell.

In some implementations, the information for the at least one parameter related to the SUL may include an exact value of the at least one parameter to be adjusted. The information for the at least one parameter related to the SUL may include a difference between the at least one parameter to be adjusted from a pre-defined value.

In some implementations, the information for the at least one parameter related to the SUL may be received via a gNB-CU Configuration Update message and/or a new message.

In step S1330, the gNB-DU adjusts the at least one parameter related to the SUL based on the information for the at least one parameter related to the SUL.

Figure 14:
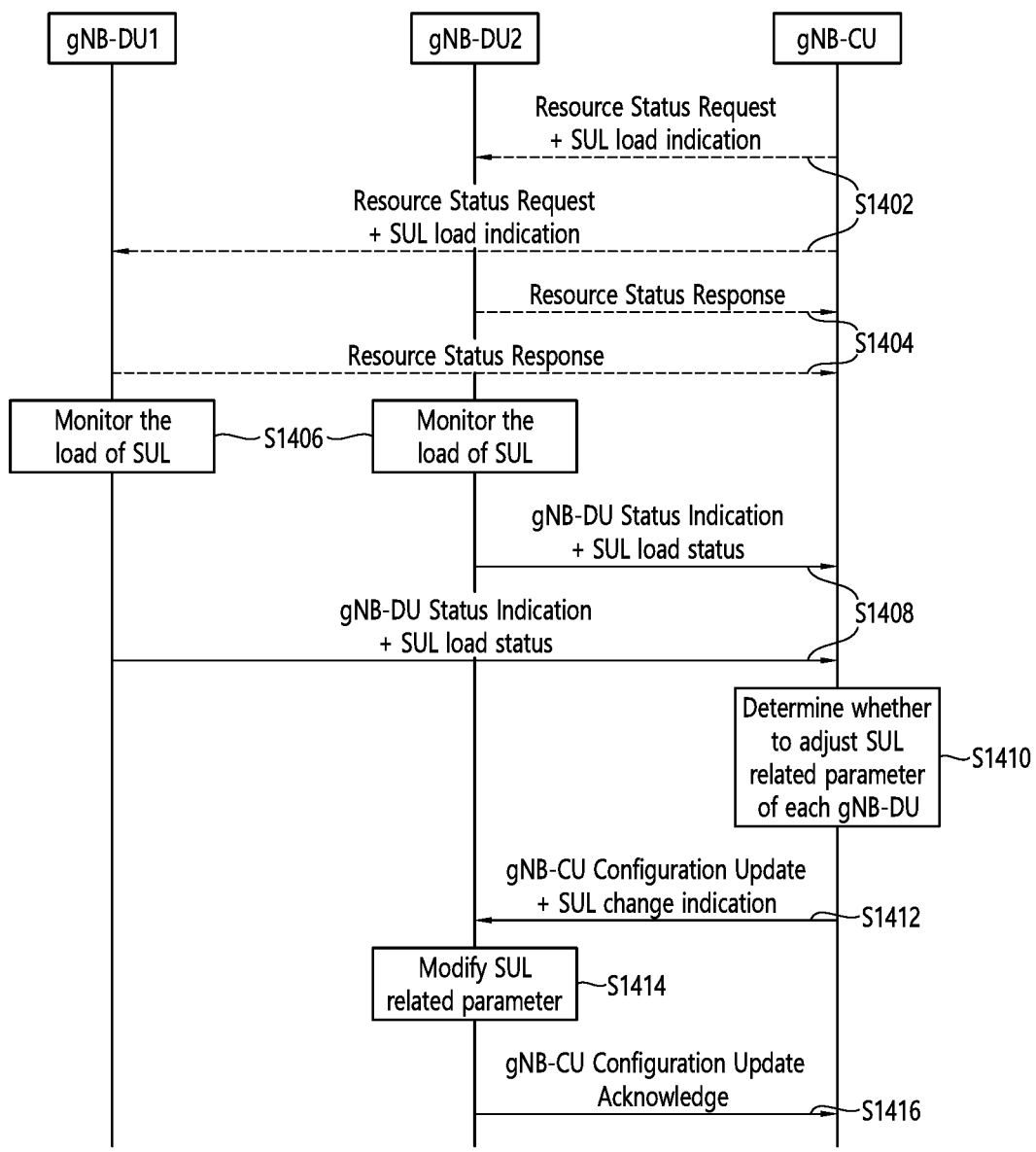
FIG. 14 shows an example of a procedure for SUL load balancing between gNB-DUs within the same gNB-CU to which the technical features of the present disclosure can be applied.

FIG. 14 shows an example of a procedure for SUL load balancing between gNB-DUs within the same gNB-CU to which the technical features of the present disclosure can be applied.

In step 1402, the gNB-CU may send to the gNB-DUs (e.g., gNB-DU1 and gNB-DU2) a SUL load indication to request reporting SUL load status per cell which each gNB-DU hosts. The SUL load indication may be transmitted via a Resource Status Request message, an existing message and/or a new message.

In step S1404, each gNB-DU (e.g., gNB-DU1 and gNB-DU2) may transmit a Resource Status Response message, an existing message and/or a new message to the gNB-CU.

In step S1406, each gNB-DU (e.g., gNB-DU1 and gNB-DU2) monitors load of SUL. Each gNB-DU may monitor the load of SUL per cell. The load of SUL may be monitored based on at least one of an amount of traffic using the SUL, the number of UEs which try to access to the SUL or are connected to the SUL, etc.

In step S1408, each gNB-DU (e.g., gNB-DU1 and gNB-DU2) transmits SUL load status to the gNB-CU to indicate the current SUL load status. The SUL load status may be transmitted per cell of each gNB-DU. For example, the SUL load status may be transmitted when the SUL load for cell(s) which the gNB-DU hosts exceeds a pre-defined threshold. For example, the SUL load status may be transmitted whenever a pre-defined time has reached. The SUL load status may include at least one of a percentage value (e.g., 0 to 100) of the SUL load, and/or a level (e.g., low, medium, or high load) of the SUL load. The SUL load status may be transmitted via a gNB-DU Status Indication message, a Resource Status Update message, an existing message and/or a new message.

In step S1410, upon receiving the SUL load status from the gNB-DUs (e.g., gNB-DU1 and gNB-DU2), the gNB-CU determines whether the SUL related parameter(s) (e.g., q-RxLevMinSUL) per cell of each gNB-DU which it hosts is needed to be adjusted.

In some implementations, the gNB-CU may initiate handover toward a neighbor target cell which has low SUL load. In this case, the gNB-CU may transmit a message including a new cause to the gNB-DU which controls the neighbor target cell having low SUL load, so that the gNB-DU which controls the neighbor target cell can apply appropriate admission control.

In step S1412, the gNB-CU transmits a SUL change indication to the gNB-DU which needs to modify the SUL related parameter(s). The SUL change indication may be transmitted per cell. For example, the SUL related parameter(s) may be a parameter included in SIM. For example, the SUL change indication may include a specific and/or an exact value of the SUL related parameter(s) to be changed. For example, the SUL change indication may include a difference value (e.g., positive or negative value) between the SUL related parameter(s) to be changed and a pre-defined value. For example, the SUL change indication may include SIB(s) (e.g., SIB2, SIB4, etc.) which the SUL related parameter(s) is modified. The SUL change indication may be transmitted via a gNB-CU Configuration Update message, an existing message and/or a new message.

In step S1414, upon receiving the SUL change indication from the gNB-CU, the gNB-DU modifies the SUL related parameter(s). For example, the gNB-DU may modify the SUL related parameter(s) contained into SIB1 based on the SUL change indication, and replace stored SIB(s) (e.g., SIB2, SIB4, etc.) with the received SUL related parameter(s).

In step S1416, the gNB-DU sends a gNB-CU Configuration Update Acknowledge message, an existing message, and/or a new message to the gNB-CU.

The present disclosure may be applied to various future technologies, such as AI.

AI

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 15:
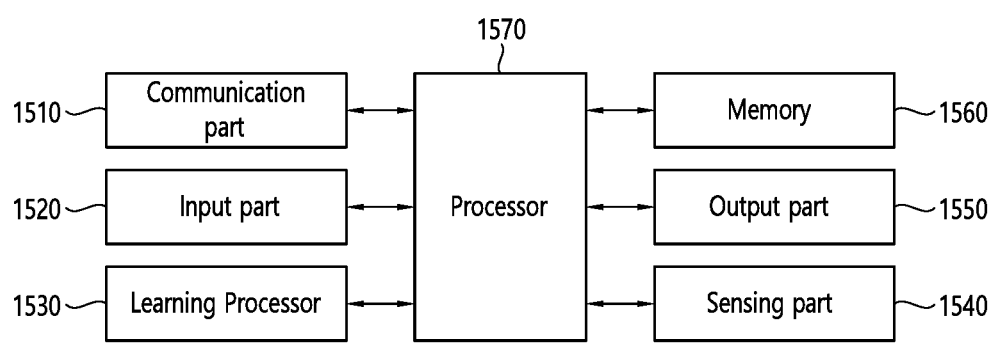
FIG. 15 shows an example of an AI device to which the technical features of the present disclosure can be applied.

FIG. 15 shows an example of an AI device to which the technical features of the present disclosure can be applied.

The AI device 1500 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 15, the AI device 1500 may include a communication part 1510, an input part 1520, a learning processor 1530, a sensing part 1540, an output part 1550, a memory 1560, and a processor 1570.

The communication part 1510 can transmit and/or receive data to and/or from external devices such as the AI devices and the AI server using wire and/or wireless communication technology. For example, the communication part 1510 can transmit and/or receive sensor information, a user input, a learning model, and a control signal with external devices. The communication technology used by the communication part 1510 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1520 can acquire various kinds of data. The input part 1520 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1520 can acquire input data to be used when acquiring an output using learning data and a learning model for model learning. The input part 1520 may obtain raw input data, in which case the processor 1570 or the learning processor 1530 may extract input features by preprocessing the input data.

The learning processor 1530 may learn a model composed of an ANN using learning data. The learned ANN can be referred to as a learning model. The learning model can be used to infer result values for new input data rather than learning data, and the inferred values can be used as a basis for determining which actions to perform. The learning processor 1530 may perform AI processing together with the learning processor of the AI server. The learning processor 1530 may include a memory integrated and/or implemented in the AI device 1500. Alternatively, the learning processor 1530 may be implemented using the memory 1560, an external memory directly coupled to the AI device 1500, and/or a memory maintained in an external device.

The sensing part 1540 may acquire at least one of internal information of the AI device 1500, environment information of the AI device 1500, and/or the user information using various sensors. The sensors included in the sensing part 1540 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1550 may generate an output related to visual, auditory, tactile, etc. The output part 1550 may include a display unit for outputting visual information, a speaker for outputting auditory information, and/or a haptic module for outputting tactile information.

The memory 1560 may store data that supports various functions of the AI device 1500. For example, the memory 1560 may store input data acquired by the input part 1520, learning data, a learning model, a learning history, etc.

The processor 1570 may determine at least one executable operation of the AI device 1500 based on information determined and/or generated using a data analysis algorithm and/or a machine learning algorithm. The processor 1570 may then control the components of the AI device 1500 to perform the determined operation. The processor 1570 may request, retrieve, receive, and/or utilize data in the learning processor 1530 and/or the memory 1560, and may control the components of the AI device 1500 to execute the predicted operation and/or the operation determined to be desirable among the at least one executable operation. The processor 1570 may generate a control signal for controlling the external device, and may transmit the generated control signal to the external device, when the external device needs to be linked to perform the determined operation. The processor 1570 may obtain the intention information for the user input and determine the user's requirements based on the obtained intention information. The processor 1570 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1530 and/or learned by the learning processor of the AI server, and/or learned by their distributed processing. The processor 1570 may collect history information including the operation contents of the AI device 1500 and/or the user's feedback on the operation, etc. The processor 1570 may store the collected history information in the memory 1560 and/or the learning processor 1530, and/or transmit to an external device such as the AI server. The collected history information can be used to update the learning model. The processor 1570 may control at least some of the components of AI device 1500 to drive an application program stored in memory 1560. Furthermore, the processor 1570 may operate two or more of the components included in the AI device 1500 in combination with each other for driving the application program.

Figure 16:
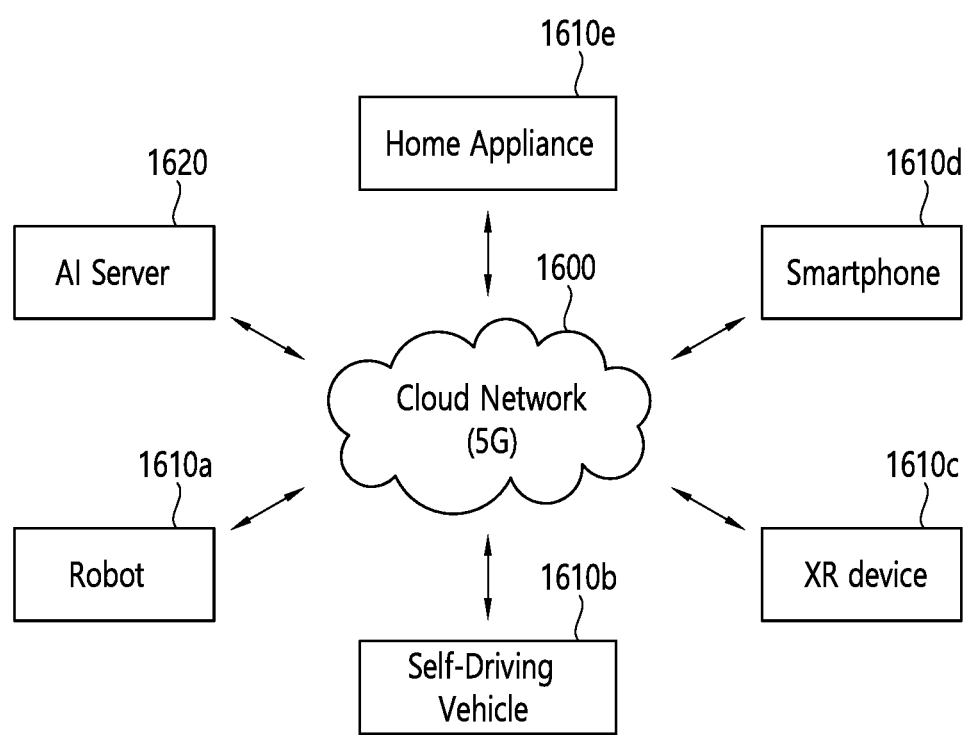
FIG. 16 shows an example of an AI system to which the technical features of the present disclosure can be applied.

FIG. 16 shows an example of an AI system to which the technical features of the present disclosure can be applied.

Referring to FIG. 16, in the AI system, at least one of an AI server 1620, a robot 1610a, an autonomous vehicle 1610b, an XR device 1610c, a smartphone 1610d and/or a home appliance 1610e is connected to a cloud network 1600. The robot 1610a, the autonomous vehicle 1610b, the XR device 1610c, the smartphone 1610d, and/or the home appliance 1610e to which the AI technology is applied may be referred to as AI devices 1610a to 1610e.

The cloud network 1600 may refer to a network that forms part of a cloud computing infrastructure and/or resides in a cloud computing infrastructure. The cloud network 1600 may be configured using a 3G network, a 4G or LTE network, and/or a 5G network. That is, each of the devices 1610a to 1610e and 1620 consisting the AI system may be connected to each other through the cloud network 1600. In particular, each of the devices 1610a to 1610e and 1620 may communicate with each other through a base station, but may directly communicate with each other without using a base station.

The AI server 1620 may include a server for performing AI processing and a server for performing operations on big data. The AI server 1620 is connected to at least one or more of AI devices constituting the AI system, i.e., the robot 1610a, the autonomous vehicle 1610b, the XR device 1610c, the smartphone 1610d and/or the home appliance 1610e through the cloud network 1600, and may assist at least some AI processing of the connected AI devices 1610a to 1610e. The AI server 1620 can learn the ANN according to the machine learning algorithm on behalf of the AI devices 1610a to 1610e, and can directly store the learning models and/or transmit them to the AI devices 1610a to 1610e. The AI server 1620 may receive the input data from the AI devices 1610a to 1610e, infer the result value with respect to the received input data using the learning model, generate a response and/or a control command based on the inferred result value, and transmit the generated data to the AI devices 1610a to 1610e. Alternatively, the AI devices 1610a to 1610e may directly infer a result value for the input data using a learning model, and generate a response and/or a control command based on the inferred result value.

Various embodiments of the AI devices 1610a to 1610e to which the technical features of the present disclosure can be applied will be described. The AI devices 1610a to 1610e shown in FIG. 16 can be seen as specific embodiments of the AI device 1500 shown in FIG. 15.

The present disclosure can have various advantageous effects.

For example, the gNB-CU can know how SUL of cells of gNB-DU(s) which it hosts is actually used. Based on this knowledge, the gNB-CU is able to balance the SUL load of cell(s) of each gNB-DU by means of change of SUL related parameter(s) or handover actions. So, it is possible to reduce or avoid a congested case for SUL of cell(s) of the gNB-DU(s) and/or distribute SUL load of cells within the same gNB-DU or of the gNB-DUs.

For example, UE's experience can be enhanced through the load balancing for SUL.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method for a gNB central unit (gNB-CU) in a wireless communication system, the method comprising:
   receiving, from at least one gNB distributed unit (gNB-DU), information related to a load status of supplementary uplink (SUL) for the at least one gNB-DU;
   determining to adjust at least one parameter related to the SUL for a gNB-DU, among the at least one gNB-DU, based on the information related to the load status of the SUL for the gNB-DU; and
   transmitting, to the gNB-DU, information related to the at least one parameter related to the SUL for the gNB-DU, wherein the at least one parameter related to the SUL for the gNB-DU includes q-RxLevMinSUL, which is a minimum required reception level in a cell.

2. The method of claim 1, wherein the information related to the load status of the SUL for the at least one gNB-DU is received per cell of the at least one gNB-DU.

3. The method of claim 1, wherein the information related to the load status of the SUL for the at least one gNB-DU includes a load percentage value of the SUL for the at least one gNB-DU.

4. The method of claim 1, wherein the information related to the load status of the SUL for the at least one gNB-DU includes a load level of the SUL for the at least one gNB-DU.

5. The method of claim 1, further comprising initiating a handover towards a neighbor cell of a second gNB-DU among the at least one gNB-DU.

6. The method of claim 1, wherein the information related to the at least one parameter related to the SUL for the gNB-DU is transmitted per cell of the gNB-DU.

7. The method of claim 1, wherein the information related to the at least one parameter related to the SUL for the gNB-DU includes an exact value of the at least one parameter to be adjusted.

8. The method of claim 1, wherein the information related to the at least one parameter related to the SUL for the gNB-DU includes a difference between the at least one parameter to be adjusted from a pre-defined value.

9. The method of claim 1, wherein a wireless device is configured with one downlink (DL) and two ULs including the SUL in a cell.

10. The method of claim 9, wherein the wireless device is in communication with at least one of a mobile device, a network, and/or autonomous vehicles other than the wireless device.

11. The method of claim 1, wherein the gNB-CU is a logical node constituting a gNB that hosts a radio resource control (RRC) layer and a packet data convergence protocol (PDCP) layer.

\* \* \* \* \*